Nov. 18, 1924.

C. T. ORDWAY 1,516,402

AUTOMATIC CONTROL

Filed July 9, 1921

WITNESSES

INVENTOR
C. T. ORDWAY
BY
ATTORNEYS

Nov. 18, 1924. 1,516,402
C. T. ORDWAY
AUTOMATIC CONTROL
Filed July 9, 1921 9 Sheets-Sheet 5

WITNESSES
INVENTOR
C.T. ORDWAY
BY
ATTORNEYS

Nov. 18, 1924.

C. T. ORDWAY 1,516,402

AUTOMATIC CONTROL

Filed July 9, 1921

WITNESSES

INVENTOR
C. T. ORDWAY
BY
ATTORNEYS

Nov. 18, 1924.
C. T. ORDWAY
1,516,402
AUTOMATIC CONTROL
Filed July 9, 1921
9 Sheets-Sheet 9
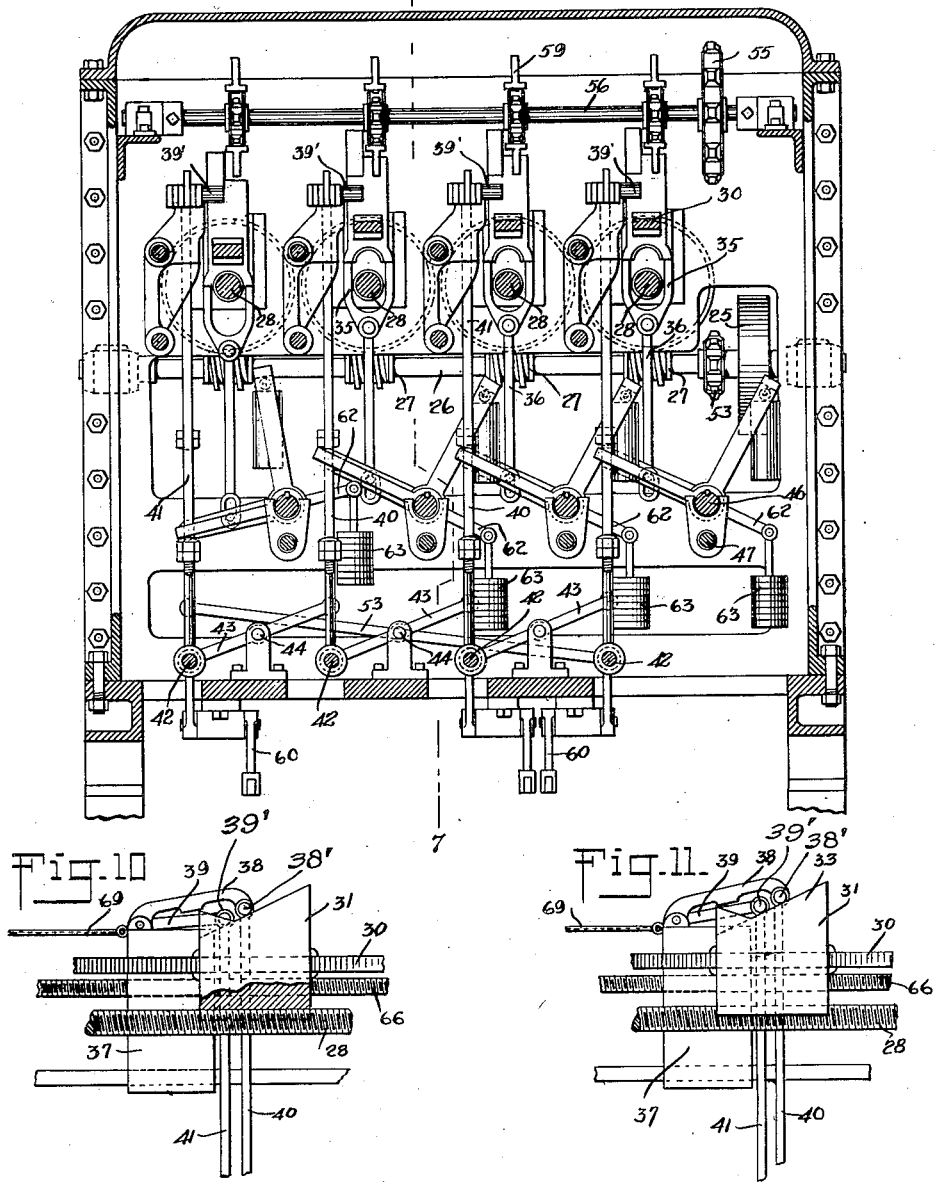

Patented Nov. 18, 1924.

1,516,402

UNITED STATES PATENT OFFICE.

CARROLL THOMAS ORDWAY, OF BROOKLYN, NEW YORK, ASSIGNOR OF ONE-HALF TO CHARLES ORDWAY, OF BROOKLYN, NEW YORK.

AUTOMATIC CONTROL.

Application filed July 9, 1921. Serial No. 483,448.

*To all whom it may concern:*

Be it known that I, CARROLL T. ORDWAY, a citizen of the United States, and resident of the city of New York, borough of Brooklyn, in the county of Kings and State of New York, have invented a new and Improved Automatic Control, of which the following is a full, clear, and exact description.

My invention relates to an automatic control and aims to provide certain new and useful improvements in connection with a device of this character.

It is a well appreciated fact in the sugar industry that considerable difficulty has been experienced incident to the operation of the centrifugal machines, in that it has been necessary for an operator to give virtually his entire attention to one of these machines. Thus it is necessary for an operator primarily to charge or load the machine with the required amount of material to be treated; secondly the operator must actuate valves to effect a washing of the material within the machines with a given amount of water, and thirdly; after the lapse of a certain interval of time, the contents of the machine must be discharged subsequent to which the entire cycle is again repeated necessitating as aforestated the constant attendance of an operator.

With this in mind my present invention aims to provide an automatic control which is primarily devised for use in connection with a sugar treating machine, but is not necessarily limited to this adaptation, and by means of which it will only be necessary for but a single operator to supervise the operations of a battery of sugar treating machines, thus eliminating the expense, delay and errors arising from manual operation as heretofore practiced.

A further object of my invention is the construction of a device of the character stated which shall be relatively simple in the disposition and construction of its parts so that a minimum amount of complication will exit.

Further objects of my invention will appear in the annexed specification taken in connection with the drawings, which latter illustrate one practical embodiment of the same, and in which.

Figure 3:
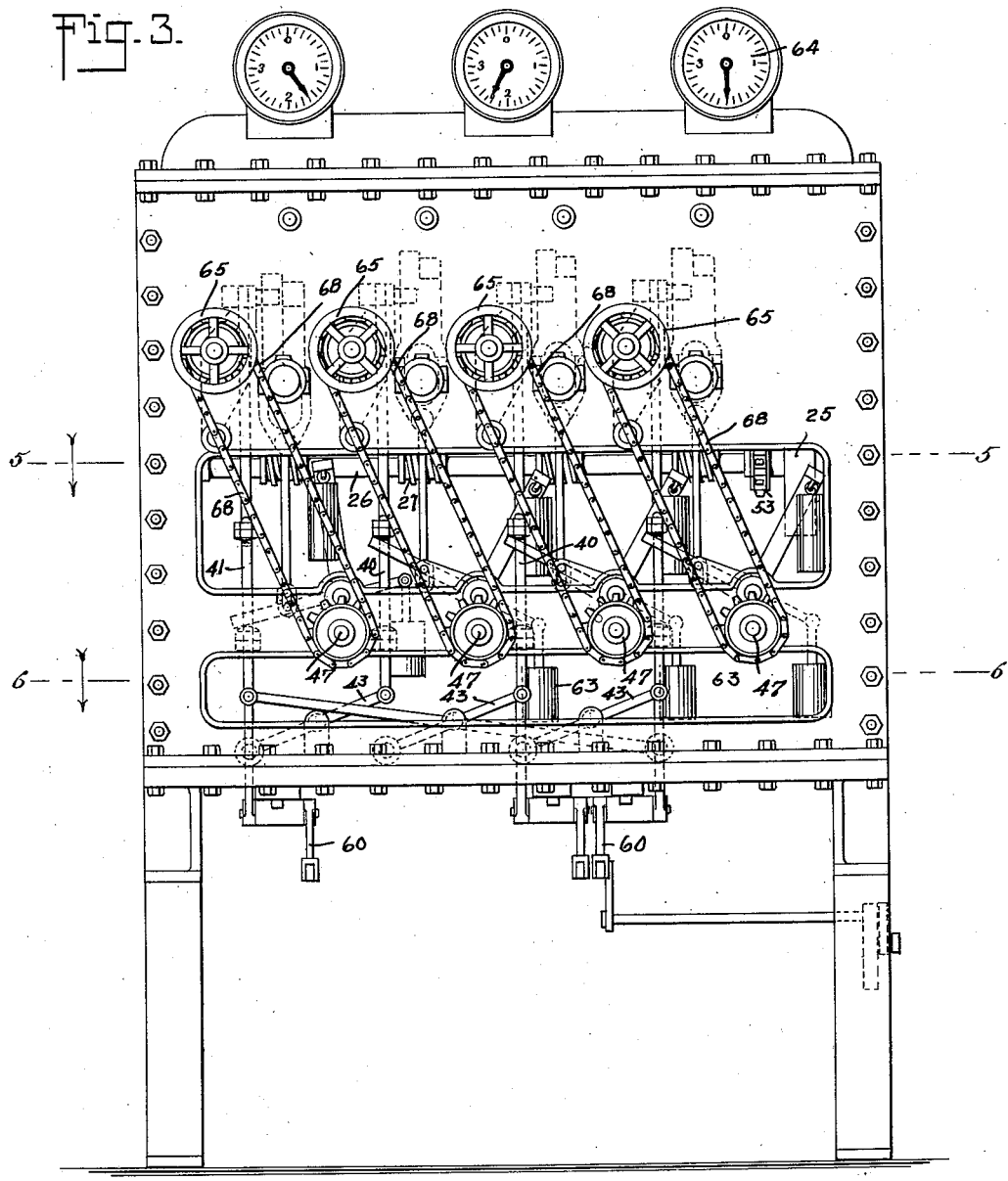
Figure 3 is a front view of the said control.
Figure 5:
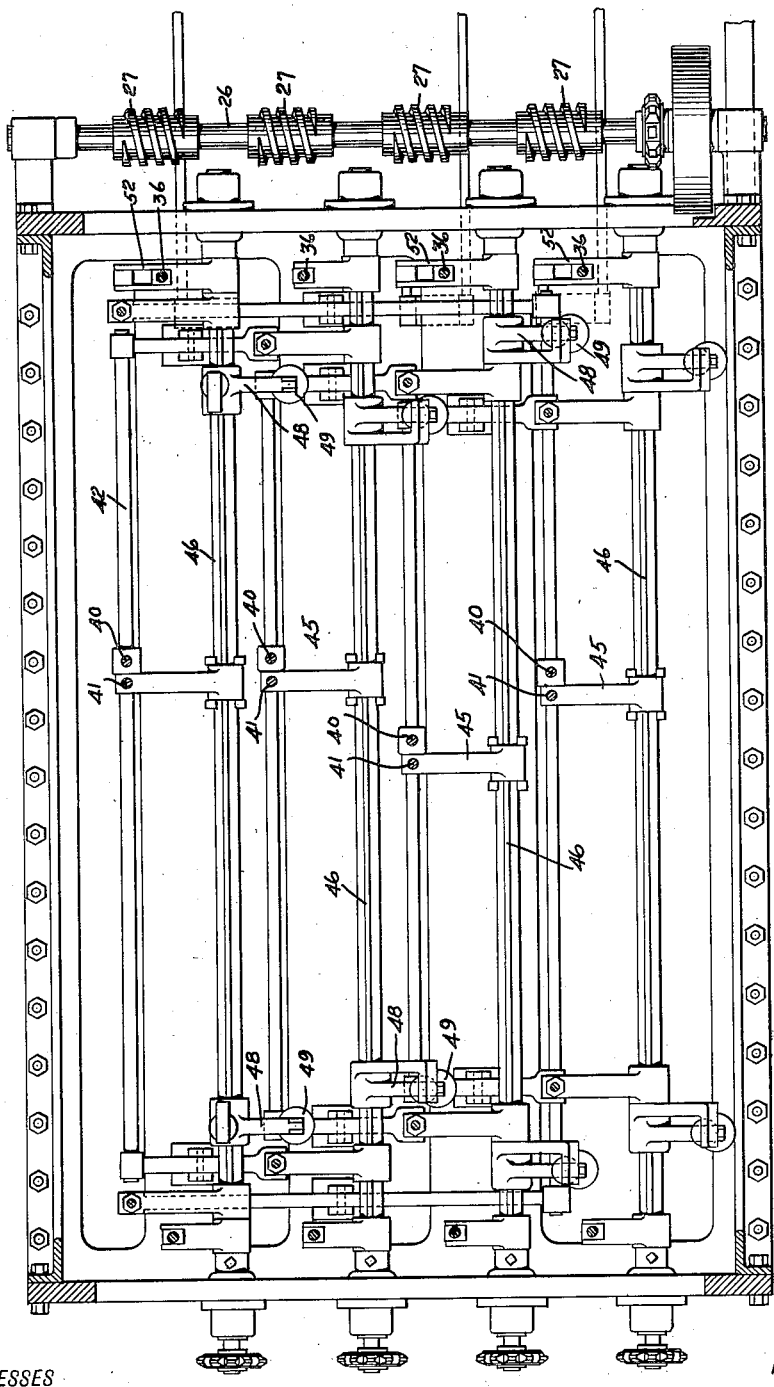
Figure 6:
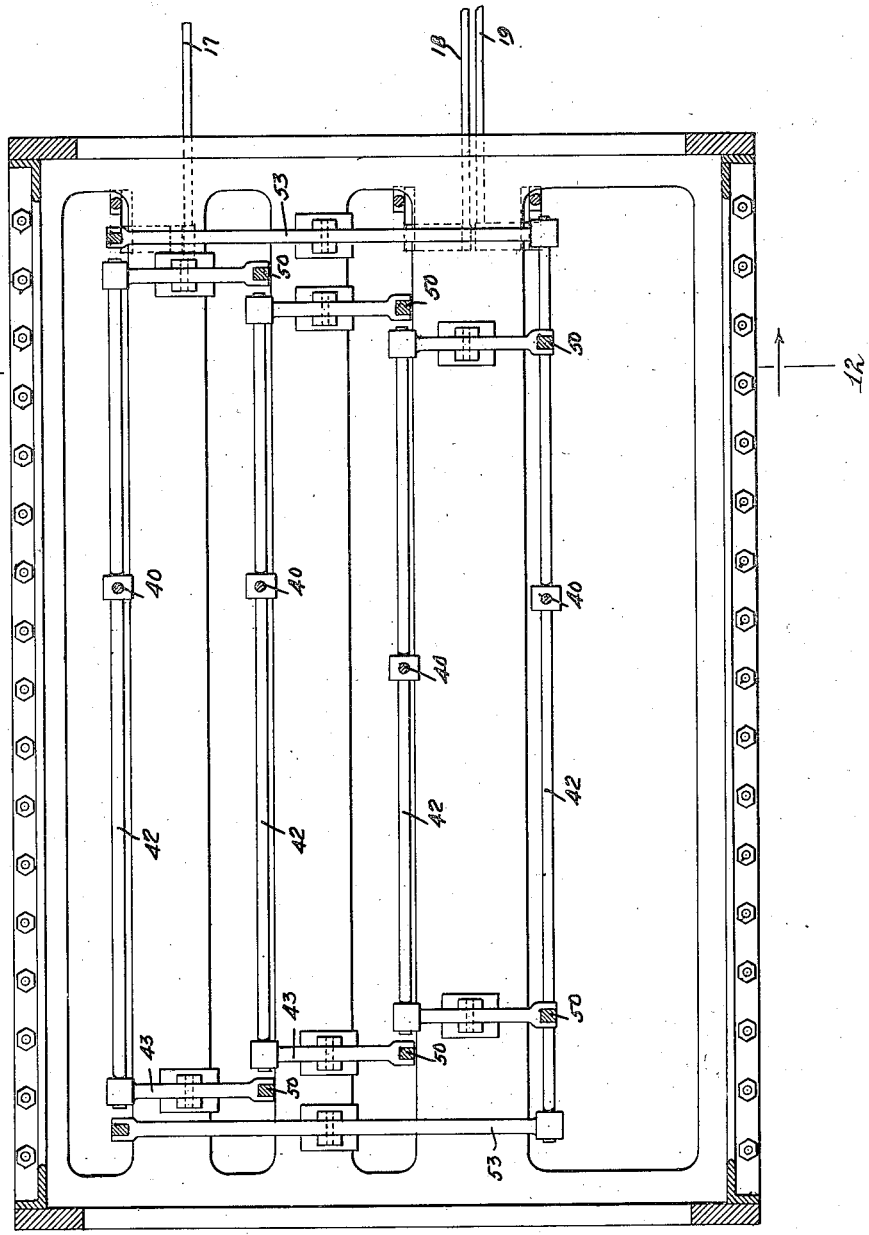

Figures 5 and 6 are sectional plan views taken respectively along the lines 5—5 and 6—6 and in the direction of the arrows indicated in Figure 3.

Figure 7:
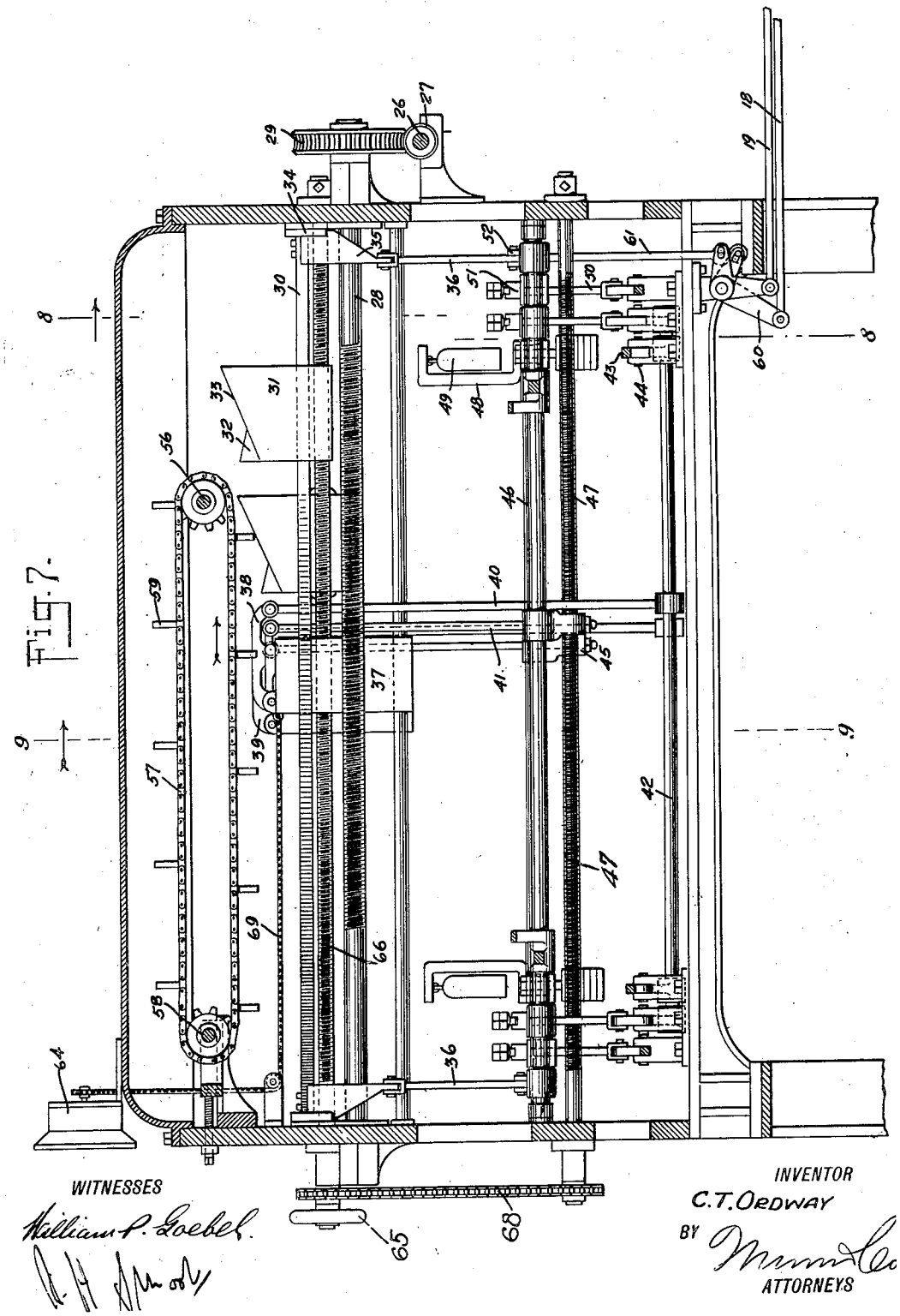

Figure 7 is a sectional side view taken along the lines 7—7 and in the direction of the arrows indicated in Figure 9.

Figure 8:
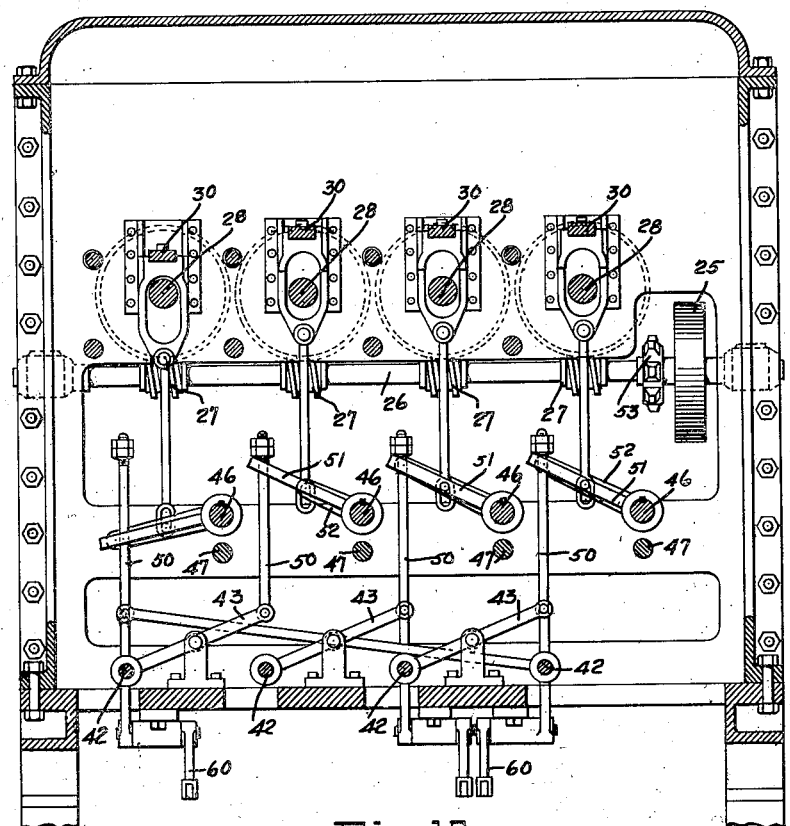

Figure 8 is a transverse sectional view taken along the line 8—8 of Figure 7.

Figure 9 is a sectional view taken along the lines 9—9 of Figure 7.

Figure 12:
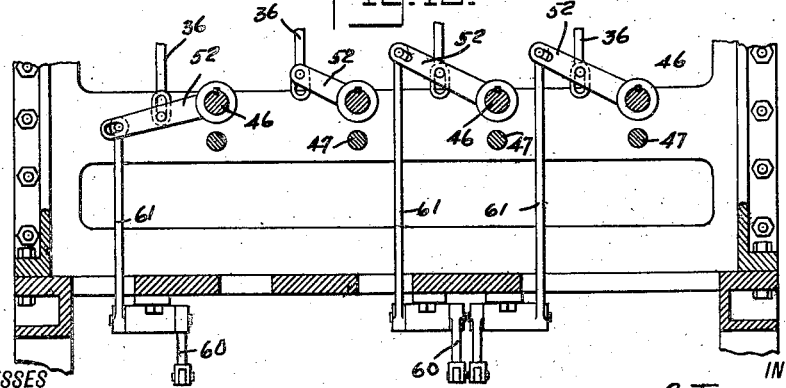

Figures 10 and 11 are fragmentary side views showing various details of construction and the disposition of the parts with respect to each other during certain parts of the cycle of operation, and Figure 12 is a fragmentary sectional view showing certain of the parts.

Figure 1:
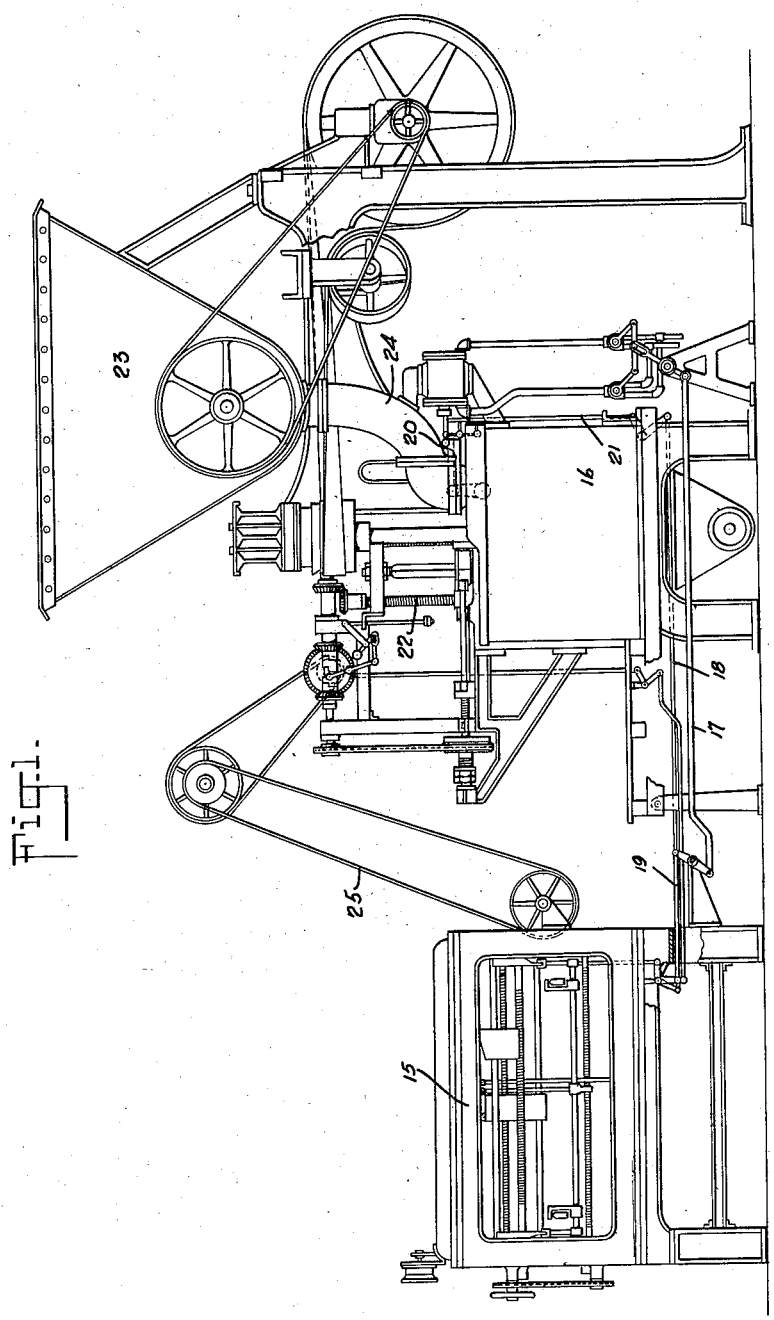
Figure 1 is a side view of a centrifugal sugar machine and showing my improved type of automatic control associated therewith.
Figure 2:
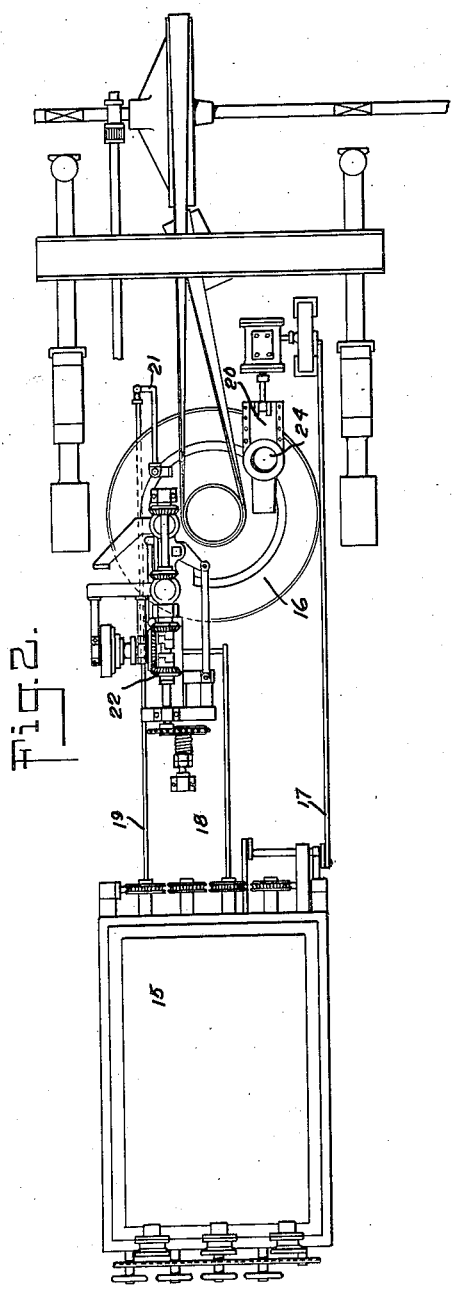
Figure 2 is a plan view of the parts as illustrated in Figure 1.

Referring now more particularly to Figures 1 and 2 it will be seen that the reference numeral 15 indicates generally the control device which is connected to the centrifugal machine 16, and operates the latter by means of control rods, 17, 18, and 19, the first of which controls the operation of the valve arm 20, the second regulating the flow of water through the pipe 21 and the last controlling the operation of the discharging mechanism.

According to the usual procedure it has been necessary for an operator to be virtually in constant attendance while the machine was being run. Thus in the well known manner the sugary mass has been stored within the hopper 23, the flow from this receptacle into the centrifugal 16 through the conduit 24 being controlled by any suitable type of valve 20. It has further been incumbent upon the operator to subsequently introduce a predetermined amount of water into the centrifugal and after the entire mass has been purged, to discharge the same from the receptacle.

By means of my automatic control device hereinafter described in detail, it will be appreciated, assuming that a suitable type of drive 25 is employed to operate the control device 15, that the rods 17, 18 and 19 or other connecting elements can be caused to operate properly so that manual operation may be entirely dispensed with, thus permitting an operator, as aforestated to merely supervise the operation of an entire battery of centrifugals, thus reducing expense in this connection.

Attention is now invited to Figures subsequent to Figures 1 and 2. It will be seen in these Figures that the drive 25 serves to rotate a shaft 26, and referring particularly to Figures 4, 7 and 9, it will be noted that the shaft 26 carries a series of worms 27 serving to impart rotation to screw threaded driving shafts 28 by means of worm wheels 29. With a view of avoiding complication I shall primarily describe the structure associated with one of the driving shafts 28. Thus it will be noted that a guide bar 30 is positioned at a point preferably above each driving shaft. A traveler 31 is slidably mounted upon the guide bar 30 and this traveler presents a shoulder 32, as well as an inclined face 33 at its upper end for a purpose hereinafter brought out. Further, the traveler 31 has a groove formed in its lower face, screw threads being formed in this groove and corresponding to the screw threads of the driving shaft 28. It will further be noted that the guide bar 30 is capable of movement either away from or towards the driving shaft 28 by virtue of the fact that it is slidably mounted within guides 34, and is further carried by brackets 35 having arms 36 connected to their lower ends.

It will thus be understood, assuming that the shaft 26 is rotated, that a movement of the arms 36 will either cause a groove in the underside of the traveler 31 to straddle the driving shaft 28, as has been shown in the left hand unit in Figure 9, or the traveler will clear the shaft 28 as in the subsequent units, and also in Figure 7. Assuming that the first is true it will further be understood that the traveler 31 by virtue of the interengagement of its screw threads with the corresponding threads of the shaft 28 will be caused to move by the latter along the guide bar 30.

It will also be noted that a stop block 37 is positioned adjacent to the shaft 28 and this block, as has been shown in Figures 7, 9, 10 and 11 carries a pair of levers 38 and 39 each of which is swingingly affixed to its body. Rods 40 and 41 have one of their ends connected to the levers 38 and 39 respectively, and it will be seen in Figures 7 and 9 that the opposite end of the rod 40 is connected to a bar 42 which in turn has its ends supported by levers 43 rockingly attached as at 44 to the base of the device. It is also to be noted that the levers 38 and 39 carry pins 38' and 39' respectively extending into the path of travel of the inclined face 33 of the block 31.

The rod 41 is connected to a bracket 45 which in turn is slidably keyed to the shaft 46 and further engages a screw threaded shaft 47. Thus subsequent to the traveler 31 having operated the rod 40 the rod 41 will have lifted and the shaft 46 rocked, this shaft carrying an arm 48 to which is attached a weight 49, the arm being disposed in such a manner that the same will merely lie at a point to either side of the shaft 46 thus acting as a retaining medium for holding this shaft to either of two positions into which it is rocked.

Assuming now that a number of units are placed side by side, as has been shown in Figures 8 and 9, and further assuming that one of these units has been placed in operation, it will be understood primarily that the traveler 31 will be moved by the main driving shaft 28 with which it is in engagement. Upon the traveler reaching a point adjacent the block 37 the rod 40 will be lifted resulting in a corresponding movement on the part of the bar 42. This movement of the latter will cause a rocking of the levers 43, and as has been shown most clearly in Figure 8, the outer ends of these levers carry links 50 which in turn are adapted to co-operate with arms 51 secured to the shaft 46 of the next adjacent unit. This will cause this shaft 46 to be rocked, thus swinging the ears 52 secured thereto downwardly. These ears support the arms 36, and thus when this operation occurs the bar 30 carrying the traveler 31 will be moved downwardly to a pont at which the latter will engage this driving shaft 28 thus moving this traveler forward. The traveler of the first unit will now cause an operation of the rod 41, and as has been best illustrated in Figure 9 this will cause the shaft 46 of the first unit to be turned by virtue of the bracket 45. This limited turning will cause the arm 48 with its associated weight 49 to be swung past dead center and the ears 52 secured to this shaft will raise the arms 36 and accordingly the bar 30 thus moving the traveler 31 out of engagement with its driving bar.

This sequence of operation will occur through as many units as form the complete control, and as has been shown in Figure 9, the bar 42 of the last unit may carry a lever 53 or other suitable device bridging all of these units and co-operating with the first of the same, thus causing a continuous repetition of operation, assuming that the travelers 31 are returned to their normal position.

Figure 4:
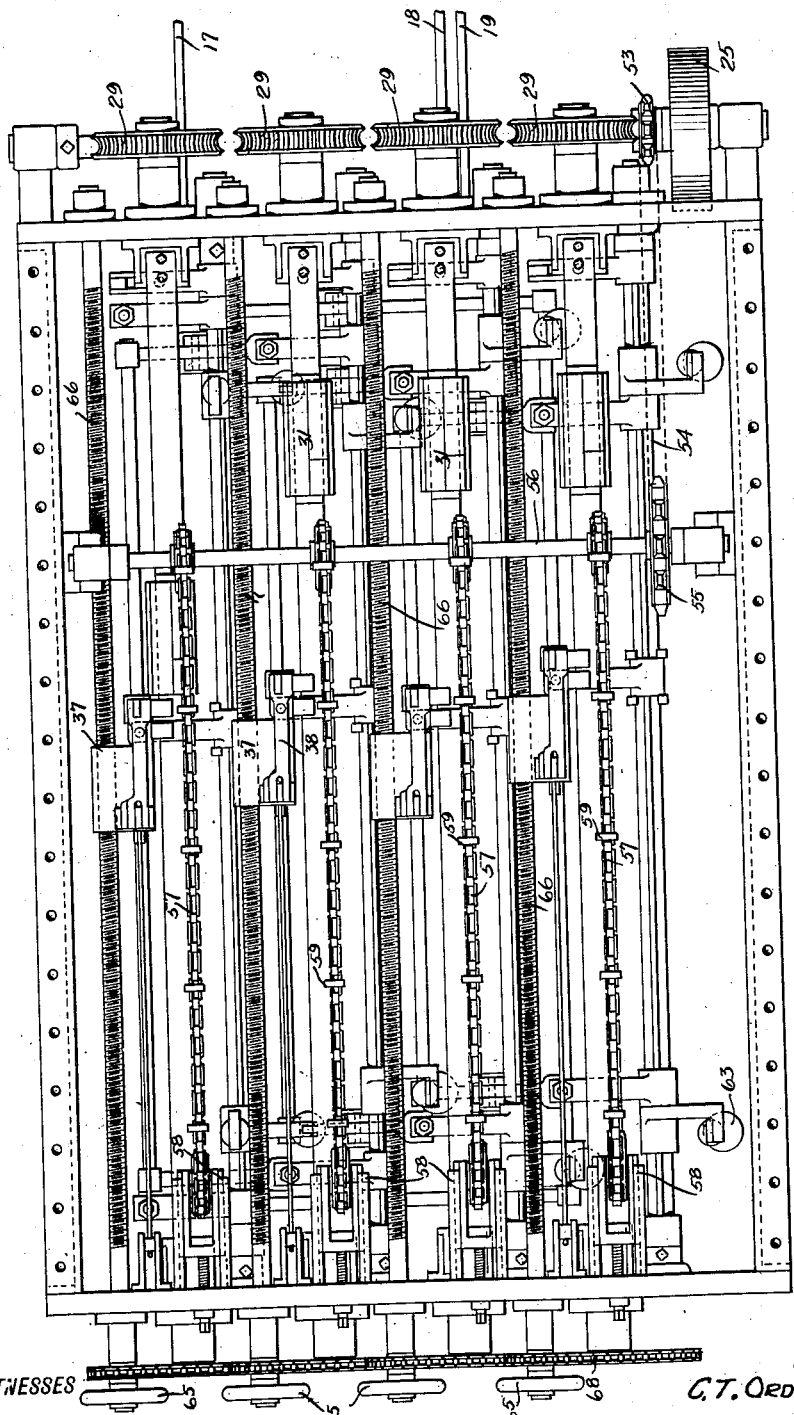
Figure 4 is a plan view of the control and showing the cover removed therefrom.

With a view of effecting this latter operation attention is invited to Figures 4, 7 and 9. In these figures it will be seen that the main driving shaft 26 also operates a sprocket gear 53' which in turn through a suitable drive 54, operates a sprocket 55 mounted upon the shaft 56. This latter shaft has endless chains 57 passing around it the opposite portion of each of these chains being supported by brackets 58. Thus these endless members move continuously and lugs 59 mounted thereon extend into a plane at which the shoulders 32 of the travelers 31 overlie the bar 30, as in its elevated position.

Thus when the bar 30 moves to a point at which the traveler is engaged by the driving shaft 28 the traveler is free to move forwardly to a point adjacent its stop block 37, but upon this bar 30 being again elevated by means of the operation aforedescribed, the shoulder 32 thereof will be engaged by one of the lugs 59 and the traveler will be slid along the bar 30 to its retracted position.

The rods 17, 18 and 19 may be connected to any desirable part of the time control, but I preferably utilize bell cranks 60 which as in Figures 7 and 12 are connected to the ears 52 by means of links 61.

Thus upon the traveler 31 having been projected to its outermost extent the ears 52 in the manner aforestated, and the rods 17, 18 and 19 will be operated thereby thus causing an operation or cessation of operation of the elements with which the outer ends of these arms are connected. It is further to be noted by this action, that reference being again had to Figure 9, each of the shafts 46 carries a further arm 62 and weight 63 which arm compensates for the weight of the various parts connected with each of the bars 46 and reduces the power necessary to operate the device to a minimum.

It will be understood, according to the operations that are to be performed that the time of movement of the travelers 31 must necessarily be capable of variation thus reference being had to Figure 3 it will be seen that a series of dials 64 are provided, one for each of the rods 16, 17 and 18 and their operating units. Furthermore handwheels 65 serve to rotate screw threaded shafts 66 and 47 a movement of which is synchronized by means of chains 68. By this construction it is possible for the operator to move the block 37 to any point desired, and by means of any suitable connecting mechanism such as 69 the position of the stop blocks 37 will be directed upon the dial 64 thus indicating the time which will be consumed in the traveler moving through its complete course.

Thus it will be appreciated that a time control particularly adapted for use in connection with a centrifugal machine is provided, but which may be utilized in any association desired. Also it will be appreciated that all of the objects set forth in the preamble of this specification have been accomplished and it will further be understood that numerous modifications of structure might readily be resorted to without in the least departing from the spirit of my invention, which I claim as;

1. In an automatic control for centrifugal machines, a plurality of units each including a rotatable driving shaft, a traveler normally disengaged from said shaft, means for moving said traveler into engagement with said shaft which is then capable of moving said traveler longitudinally thereof, means arranged in the path of movement of said traveler and contacted thereby after said traveler has moved a predetermined distance, and means operated by said contact to actuate the traveler of a different unit to engage its associated driving shaft to cause an operation of the last-named traveler similar to that of the first-named traveler.

2. In an automatic control for centrifugal machines, a plurality of units each including a rotatable driving shaft, a traveler normally disengaged from said shaft, means for moving said traveler into engagement with said shaft which is then capable of moving said traveler longitudinally thereof, means arranged in the path of movement of said traveler and contacted thereby after said traveler has moved a predetermined distance, means for positioning the last-named means with respect to said traveler to vary the distance the latter moves when engaged with said shaft, and means operated by said contact to actuate the traveler of a different unit to engage its associated driving shaft to cause an operation of the last-named traveler similar to that of the first-named traveler.

3. In an automatic control for centrifugal machines, a plurality of units each including a rotatable driving shaft, a traveler normally disengaged from said shaft, means for moving said traveler into engagement with said shaft which is then capable of moving said traveler longitudinally thereof, means arranged in the path of movement of said traveler and contacted thereby after said traveler has moved a predetermined distance, means operated by said contact to actuate the traveler of a different unit to engage its associated driving shaft to cause an operation of the last-named traveler similar to that of the first-named traveler, and continuously operated means for successively restoring said travelers to normal subsequent to their contact with the second-named means.

4. In an automatic control for centrifugal machines, a plurality of units each including a rotatable driving shaft, a traveler normally disengaged from said shaft, means for moving said traveler into engagement with said shaft which is then capable of moving said traveler longitudinally thereof, means arranged in the path of movement of said traveler and contacted thereby after said traveler has moved a predetermined distance, means for positioning the last-named means with respect to said traveler to vary the distance the latter moves when engaged with said shaft, means operated by said contact to actuate the traveler of a different unit to engage its associated driving shaft to cause an operation of the last-named traveler similar to that of the first-named traveler, and continuously operated means for successively restoring said travelers to normal subsequent to their contact with the second-named means.

5. In an automatic control for centrifugal machines, a plurality of units each including a rotatable driving shaft, a traveler normally disengaged from said shaft, means for moving said traveler into engagement with said shaft which is then capable of moving said traveler longitudinally thereof, means arranged in the path of movement of said traveler and contacted thereby after said traveler has moved a predetermined distance, and connections between the last-named means and the traveler of one of the other units actuated by said contact to engage the last-named traveler with its driving shaft.

6. In an automatic control for centrifugal machines, a plurality of units each including a rotatable driving shaft, a traveler normally disengaged from said shaft, means for moving said traveler into engagement with said shaft which is then capable of moving said traveler longitudinally thereof, means arranged in the path of movement of said traveler and contacted thereby after said traveler has moved a predetermined distance, means operated by said contact to actuate the traveler of a different unit to engage its associated driving shaft to cause an operation of the last-named traveler similar to that of the first-named traveler, and means common to the driving shafts of various units for simultaneously rotating the same to move the associated travelers along the shafts when engaged thereby.

7. In an automatic control for centrifugal machines, a plurality of units each including a rotatable driving shaft, a traveler normally disengaged from said shaft, means for moving said traveler into engagement with said shaft which is then capable of moving said traveler longitudinally thereof, means arranged in the path of movement of said traveler and contacted thereby after said traveler has moved a predetermined distance, means operated by said contact to actuate the traveler of a different unit to engage its associated driving shaft to cause an operation of the last-named traveler similar to that of the first-named traveler, and a continuously operated endless element having means engageable with said travelers to effect the restoration thereof to their initial positions.

8. An automatic control including a unit comprising a screw threaded driving shaft, a traveler formed with a screw threaded groove in its under face, a bar upon which said traveler is slidably mounted, means for rotating said driving shaft, said traveler presenting an inclined face, a stop block, rods movably attached to said stop block, pins secured to said rods and extending into the path of travel of said traveler, and means connected to said rods and co-operating with said bar to automatically disengage said traveler from said driving shaft when the former has reached a predetermined point thereon.

9. An automatic control including a unit comprising a screw threaded driving shaft, a traveler formed with a screw threaded groove in its under face, a bar upon which said traveler is slidably mounted, means for rotating said driving shaft, said traveler presenting an inclined face, a stop block, rods movably attached to said stop block, pins secured to said rods and extending into the path of travel of said traveler, means connected to said rods and co-operating with said bar to automatically disengage said traveler from said driving shaft when the former has reached a predetermined point thereon, and movable means adjacent said traveler and being adapted to engage the same upon the latter being disengaged from the driving shaft whereby to return the same to its normal position.

10. An automatic control including a unit comprising a screw threaded driving shaft, a traveler formed with a screw threaded groove in its under face, a bar upon which said traveler is slidably mounted, means for rotating said driving shaft, said traveler presenting an inclined face, a stop block, rods movably attached to said stop block, pins secured to said rods and extending into the path of travel of said traveler, means connected to said rods and co-operating with said bar to automatically disengage said traveler from said driving shaft when the former has reached a predetermined point thereon, and means permitting of said stop block being moved with respect to said main driving shaft.

11. An automatic control including a unit comprising a screw threaded driving shaft, a traveler formed with a screw threaded groove in its under face, a bar upon which said traveler is slidably mounted, means for rotating said driving shaft, said traveler presenting an inclined face, a stop block, rods movably attached to said stop block, pins secured to said rods and extending into the path of travel of said traveler, means connected to said rods and co-operating with said bar to automatically disengage said traveler from said driving shaft when the former has reached a predetermined point thereon, and a secondary shaft upon which said stop block is mounted, said secondary shaft lying in a plane parallel to said first named shaft, whereby said stop block may be brought to lie in any position within the limits of travel of said traveler.

CARROLL THOMAS ORDWAY.